United States Patent
Geisler et al.

(10) Patent No.: US 10,156,992 B2
(45) Date of Patent: Dec. 18, 2018

(54) METHOD FOR DATA REDUCTION OF ITEMS OF SENSOR DATA INFORMATION

(71) Applicant: Robert Bosch GMBH, Stuttgart (DE)

(72) Inventors: Dominik Geisler, Tuebingen (DE); Thomas Block, Walddorfhaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 103 days.

(21) Appl. No.: 14/997,047

(22) Filed: Jan. 15, 2016

(65) Prior Publication Data

US 2016/0210081 A1 Jul. 21, 2016

(30) Foreign Application Priority Data

Jan. 20, 2015 (DE) .................. 10 2015 200 779

(51) Int. Cl.
*G06F 3/06* (2006.01)
*G06F 12/02* (2006.01)

(52) U.S. Cl.
CPC .......... *G06F 3/0608* (2013.01); *G06F 3/0641* (2013.01); *G06F 3/0652* (2013.01); *G06F 3/0659* (2013.01); *G06F 3/0671* (2013.01); *G06F 12/023* (2013.01)

(58) Field of Classification Search
CPC . Y02B 60/1225; G06F 3/0608; G06F 3/0613; G06F 3/0641; G06F 3/0646; G06F 2003/0691; G06F 12/023
See application file for complete search history.

(56) References Cited

U.S. PATENT DOCUMENTS

| | | | |
|---|---|---|---|
| 7,567,188 B1* | 7/2009 | Anglin | G06F 3/0608 341/63 |
| 8,600,122 B2* | 12/2013 | Dean | G06K 9/00026 382/115 |
| 9,141,554 B1* | 9/2015 | Candelaria | G06F 12/0864 |
| 9,384,205 B1* | 7/2016 | Gipp | G06F 17/30156 |
| 2012/0106309 A1* | 5/2012 | Oishi | G06F 3/0608 369/53.44 |
| 2012/0124011 A1* | 5/2012 | Spackman | G06F 17/30162 707/692 |
| 2012/0197911 A1* | 8/2012 | Banka | G06F 17/30864 707/752 |
| 2012/0257626 A1* | 10/2012 | McGhee | H04L 45/7453 370/392 |
| 2015/0006793 A1* | 1/2015 | Shin | G06F 3/0641 711/103 |
| 2016/0043977 A1* | 2/2016 | Schwetman, Jr. | G06F 3/0608 711/133 |

* cited by examiner

*Primary Examiner* — Hal Schnee
(74) *Attorney, Agent, or Firm* — Norton Rose Fulbright US LLP; Gerard Messina

(57) ABSTRACT

A method for data reduction of items of sensor data information, a plurality of data frames being stored in a buffer memory, a data frame including a sensor data representative and an item of discard information of a discard counter, a plurality of items of sensor data information being assigned to a data frame in a comparison operation.

10 Claims, 2 Drawing Sheets

METHOD FOR DATA REDUCTION OF ITEMS OF SENSOR DATA INFORMATION

CROSS REFERENCE

The present application claims the benefit under 35 U.S.C. § 119 of German Patent Application No. DE 102015200779.0 filed on Jan. 20, 2015, which is expressly incorporated herein by reference in its entirety.

FIELD

The present invention is directed to a method for data reduction of items of sensor data.

BACKGROUND INFORMATION

Storing items of sensor data information in buffer memories is generally conventional. When the buffer memory is full, the main processor has to change into the recovery phase. The power consumption of the main processor may be reduced by a reduction of the required number of recovery phases of the main processor. The required number of recovery phases of the main processor may be reduced by a larger storage capacity of the buffer memory, however, such an enlargement of the storage capacity of the buffer memory results in an increase of the required space and therefore in significantly higher costs.

SUMMARY

Example embodiments of the method according to the present invention for data reduction of items of sensor data information may have the advantage over the related art that the required number of recovery phases of the main processor and, linked thereto, the power consumption of the main processor may be reduced without enlarging the storage space. This is achieved in that the number of the items of sensor data information stored in the buffer memory is reduced, in that a plurality of items of sensor data information is assigned to a data frame in the event of a comparison operation and therefore only the storage space for the one data frame instead of that for the plurality of items of sensor data information is required in the buffer memory. Advantageous embodiments and refinements of the present invention may be inferred from the description below with reference to the figures.

According to one preferred refinement, it is provided that the comparison operation and, accompanying this, assignment of the items of sensor data information to the sensor data representatives are carried out in that in a first method step—in the situation that a first item of sensor data information is processed—an item of storage information is stored in a buffer store and the discard counter is in an initial state, in a second method step, a comparison result is obtained by comparing the item of storage information to a second item of sensor data information, in a third method step, as a function of the comparison result, the second item of sensor data information is discarded while incrementing the discard counter.

In this way, it is advantageously made possible that the number of the data frames stored in the buffer memory is reduced, in that it is determined on the basis of a comparison result whether the sensor data information may be deleted.

According to one preferred refinement, it is provided that alternatively in the third method step, as a function of the comparison result, a first sensor data representative of at least one item of sensor data information is stored with an item of discard information of a discard counter in a data frame in the buffer memory and the discard counter is set to the initial state. In this way, it is advantageously made possible that, if a deviation was ascertained by the comparison result, which is greater than a predefined threshold, a data frame is stored in the buffer memory.

According to one preferred refinement, it is provided that the storage information is either—until the next storage of a sensor data representative—static or is newly calculated variably upon change of the discard counter information. In this way, it is advantageously made possible that the storage information is determined in accordance with the particular requirement.

According to one preferred refinement, it is provided that the storage information is static, the second and third method steps are repeated using a further item of sensor data information after the third method step, for the case in which the storage information is variable; after the third method step, either the second and third method steps are repeated using a further item of sensor data information or the first, the second, and the third method steps are repeated using at least one further item of sensor data information. In this way, it is advantageously made possible that by way of the repetition of the second and third method steps, an arbitrary number of items of sensor data information are discarded on the basis of the comparison result either by incrementing of the discard counter, or a sensor data representative of the sensor data information is stored in a data frame in the buffer memory.

According to one preferred refinement, it is provided that the sensor data representative corresponds to one of the assigned items of sensor data information or is newly determined from these items of sensor data information. In this way, it is advantageously made possible that, based on the sensor data representative, conclusions about the items of sensor data information, which are assigned to it, may be drawn.

According to one preferred refinement, it is provided that a maximum run length, which corresponds to the maximum number of items of sensor data information which are assigned to a sensor data representative, is specified, storage being performed independently of the comparison result upon reaching the maximum run length. In this way, it is advantageously made possible that even if the items of sensor data information were discarded on the basis of the comparison result, a sensor data representative of an item of sensor data information is stored regularly in a data frame at a fixed interval, which corresponds to the maximum run length.

A further object of the present invention is a sensor data analysis device, the sensor data analysis device including a buffer memory and a comparison unit, the comparison unit including a buffer store and a computing unit, the sensor data analysis device being configured to receive a plurality of items of sensor data information from a sensor, the sensor data analysis device being configured to assign multiple items of sensor data information to a data frame in the comparison unit. In this way, it is advantageously made possible that the required number of recovery phases of the main processor and, linked thereto, the power consumption of the main processor are reduced without enlarging the storage space.

According to one preferred refinement, it is provided that the sensor data analysis device is designed to transmit a plurality of output data to a microcontroller, the output data including a plurality of data frames or a plurality of decompressed data frames. In this way, it is advantageously made possible that the output data may be transmitted in accordance with the particular requirements.

According to one preferred refinement, it is provided that the sensor data analysis device is configured in such a way that the number of the sensor data representatives, which are stored in a fixed period in the buffer memory, is variable. In this way, it is advantageously made possible that the storage capacity of the buffer memory may be used efficiently.

Advantageous embodiments and refinements of the present invention may be inferred from the description herein with reference to the figures.

DETAILED DESCRIPTION OF EXAMPLE EMBODIMENTS

Figure 1:
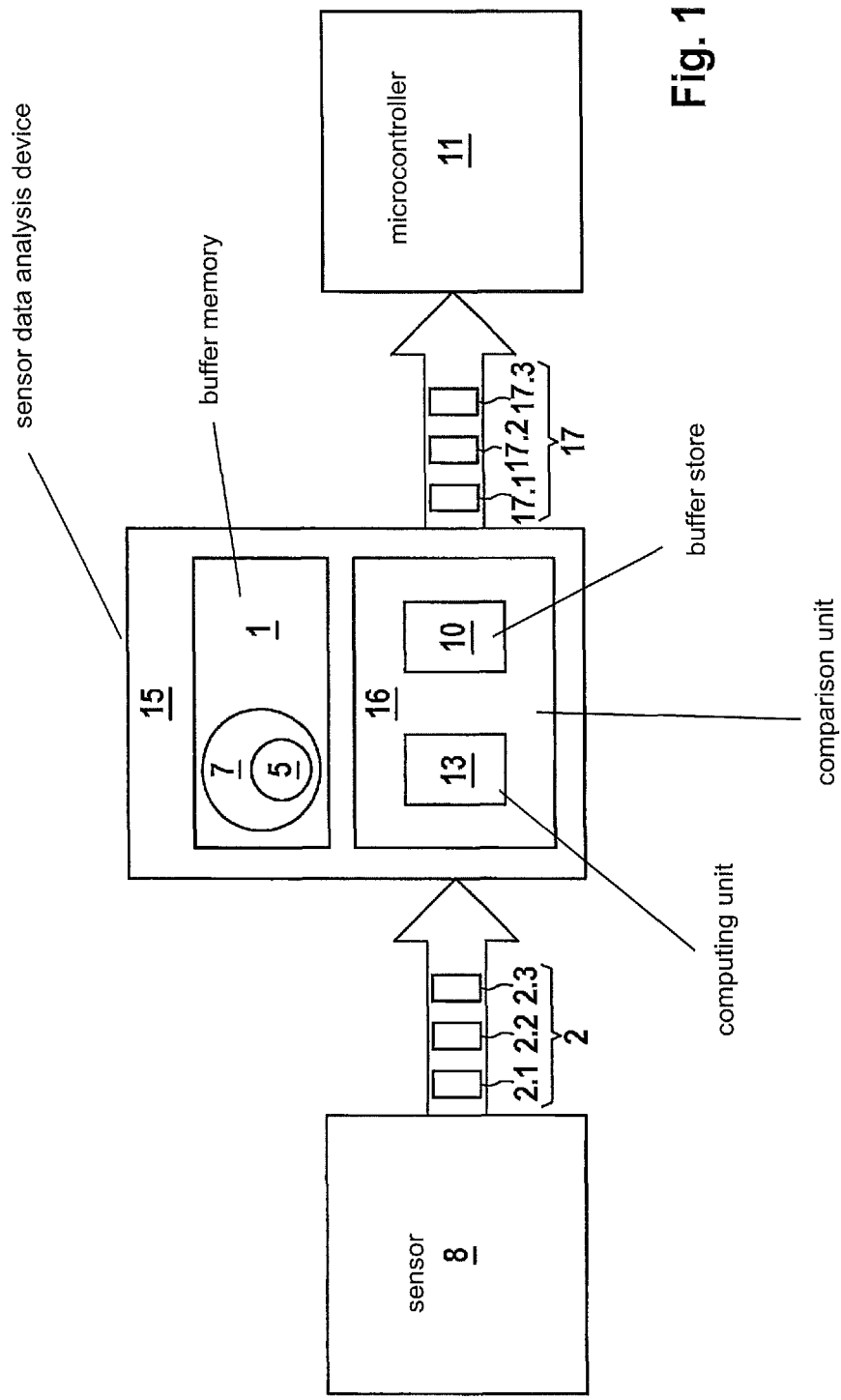
FIG. 1 schematically shows a sensor data analysis device, a sensor, and a microcontroller according to one exemplary specific embodiment of the present invention.

In the various figures, identical parts are provided with identical reference numerals and are therefore generally also only named or mentioned once in each case.

FIG. 1 shows, according to one exemplary specific embodiment of the present invention, a sensor data analysis device 15, which has a buffer memory 1 and a comparison unit 16, comparison unit 16 including a buffer store 10 and a computing unit 13. A plurality of items of sensor data information 2 is transferred from a sensor 8 to sensor data analysis device 15. A plurality of items of sensor data information 2 is assigned to a data frame 7 in comparison unit 16. Data frames 7 are stored in buffer memory 1. A plurality of output data 17 is transferred to a microcontroller 11. Output data 17 include a plurality of data frames 7 or a plurality of decompressed data frames. The number of sensor data representatives 5 which are stored in a fixed period in buffer memory 1 is variable as a function of the signal.

Figure 2:
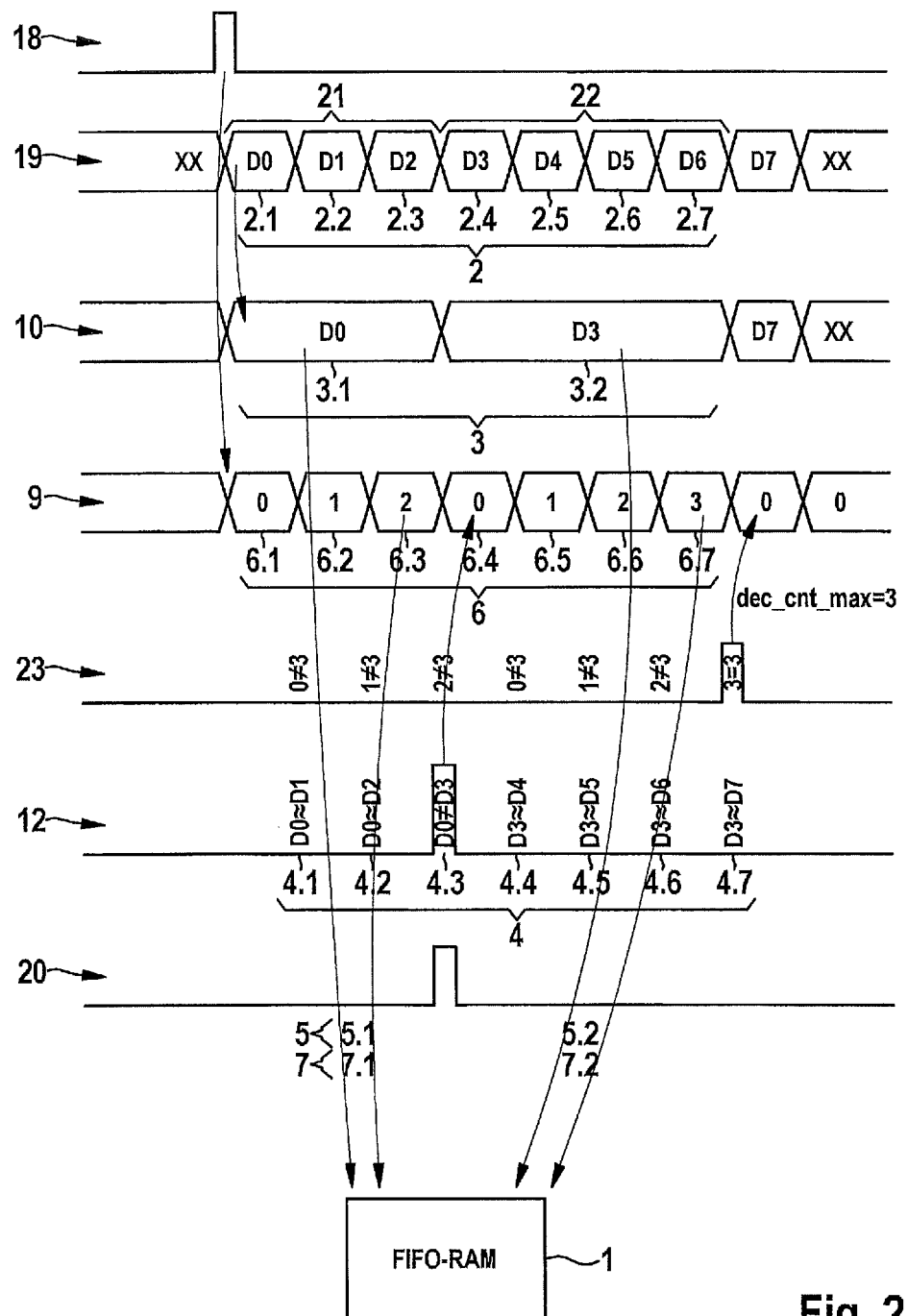
FIG. 2 schematically shows a transition diagram of an example method for data reduction of items of sensor data information according to the present invention.

FIG. 2 schematically shows a transition diagram of a method for data reduction of items of sensor data information 2 with a predefined maximum run length according to one exemplary specific embodiment of the present invention, data frames 7 being stored in a buffer memory 1, buffer memory 1 being a first-in first-out (FIFO) memory.

In a first method step, a reset operation 18 is carried out, a first item of discard counter information 6.1 being set to zero, a first item of sensor data information 2.1 being transferred via buffer memory input 19 to the sensor data analysis device, and the first item of sensor data information 2.1 being stored as a first item of storage information 3.1 in a buffer store 10.

A second item of sensor data information 2.2 is transferred via buffer memory input 19 to the sensor data analysis device. In a second method step 12, a first comparison result 4.1 is determined by comparing the second item of sensor data information 2.2 to the first item of storage information 3.1, the first comparison result 4.1 indicating that the second item of sensor data information 2.2 corresponds to the first item of storage information 3.1 within the scope of a predefined threshold. In a third method step, based on first comparison result 4.1, the second item of sensor data information 2.2 is discarded and a second item of discard counter information 6.2 is set to one.

Thereafter, a third item of sensor data information 2.3 is transferred via buffer memory input 19 to the sensor data analysis device and the second method step 12 and the third method step are repeated using third item of sensor data information 2.3. In a second method step 12, a second comparison result 4.2 is determined by comparing the third item of sensor data information 2.3 to the first item of storage information 3.1, the second comparison result 4.2 indicating that the third item of sensor data information 2.3 corresponds to the first item of storage information 3.1 within the scope of a predefined threshold. In a third method step, based on second comparison result 4.2, the third item of sensor data information 2.3 is discarded and a third item of discard counter information 6.3 is set to two.

Thereafter, a fourth item of sensor data information 2.4 is transferred via buffer memory input 19 to the sensor data analysis device and the second method step 12 and the third method step are repeated using the fourth item of sensor data information 2.4. In a second method step 12, a third comparison result 4.3 is determined by comparing the fourth item of sensor data information 2.4 to the first item of storage information 3.1, the third comparison result 4.2 indicating that the fourth item of sensor data information 2.4 deviates more strongly than a predefined threshold from first item of storage information 3.1. In a third method step, based on the third comparison result 4.3, a storage operation 20 takes place, in which a first data frame 5.1 is stored in buffer memory 1 and discard counter 9 is set to the initial state. First data frame 5.1 includes the first item of storage information 3.1 and the third item of discard counter information 6.3. A first run (21) is thus completed.

In a second run (22), the fourth item of sensor data information 2.4 is stored as a second item of storage information 3.2 in a buffer store 10. Thereafter, a fifth item of sensor data information 2.5, a sixth item of sensor data information 2.6, and a seventh item of sensor data information 2.7 are transmitted via buffer memory input 20 and the second method step 12 and the third method step are each carried out once using the fifth item of sensor data information 2.5, the sixth item of sensor data information 2.6, and the seventh item of sensor data information 2.7. The comparison to the second item of storage information 3.2 takes place in the second method step 12. In the third method step, based on the particular comparison result, both the fifth item of sensor data information 2.5 and the sixth item of sensor data information 2.6 are discarded and in each case discard counter count 9 is incremented by one. After the third method step has been carried out for sixth item of sensor data information 2.6, discard counter comparison 23 yields that the maximum run length is reached. Therefore, independently of the comparison result, a second data frame 5.2 is stored in buffer memory 1 and discard counter 9 is set to the initial state. Second data frame 5.2 includes a second item of storage information 3.2 and an item of discard counter information 6.7 which corresponds to the maximum run length. Second run 22 is thus completed.

According to another specific embodiment, a maximum run length is not specified, but rather a sensor data representative 5 is stored in a data frame 7 in buffer memory 1 only as a function of comparison result 4.

According to other alternative specific embodiments, the storage information is formed differently from the above description in such a way that the storage information:

includes an item of sensor data information 2, or includes a plurality of items of sensor data information 2, or includes a running mean value calculated from a plurality of items of sensor data information 2, or includes an IIR (infinite impulse response) value calculated from a plurality of items of sensor data information 2, in the comparison operation, the IIR value of items of sensor data information 2, which are to be compared to the storage information, also being calculated, or includes an FIR (finite impulse response) value calculated from a plurality of items of sensor data information 2, in the comparison operation, the FIR value of items of sensor data information 2, which are to be compared to the storage information, also being calculated, or includes another characteristic value calculated from a plurality of items of sensor data information 2.

According to other alternative specific embodiments, the data frame is formed differently from the above description in such a way that the data frame:

includes a mean value calculated from a plurality of items of sensor data information 2, or includes a median calculated from a plurality of items of sensor data information 2, or includes an item of sensor data information 2, or includes a plurality of items of sensor data information 2, or includes another characteristic value calculated from a plurality of items of sensor data information 2.

According to other alternative specific embodiments, the comparison operation is formed carried out differently from the above description in such a way that the comparison operation:

includes difference formation between an item of storage information 3 and an item of sensor data information 2, or includes calculation of a standard deviation from a plurality of items of sensor data information 2, or includes calculation of the difference between a minimum item of sensor data information and a maximum item of sensor data information, or includes another characteristic value calculated from a plurality of items of sensor data information 2.

According to another specific embodiment, the comparison operation includes a threshold, with the aid of which it is decided whether sensor data information 2 is discarded, the threshold being adapted as a function of how strongly buffer memory 1 is filled and/or the run length being adapted as a function of how strongly buffer memory 1 is filled, in particular adapted automatically.

According to another specific embodiment, during the comparison operation, a comparison is carried out between a first number of items of sensor data information, to which a function is applied, and an item of storage information, the storage information resulting from a function which is applied to a second number of items of sensor data information, the first number of items of sensor data information and the second number of items of sensor data information being unequal, in particular the first number of items of sensor data information belonging to an extended run.

According to another specific embodiment, the comparison operation includes the comparison of items of sensor data information 2 made of tuples, the difference of an Nth component of a tuple from an Nth component of another tuple being calculated and it being tested whether the difference exceeds a specified threshold, the specified threshold being able to be different for different components of a tuple or the specified threshold being equal for different components of a tuple, which relate to the same measured variable (for example, multiple components of the tuple, which contain acceleration data, have the same threshold).

According to another specific embodiment, the comparison operation includes the comparison of items of sensor data information 2 made of tuples, a single characteristic value (for example, maximum value-minimum value, median, total of the absolute values), which is used in the comparison operation, being ascertained from the components of a tuple.

According to another specific embodiment, the comparison operation includes the comparison of items of sensor data information 2 made of tuples, the difference of an Nth component of a tuple from an Nth component of another tuple being formed, this step being repeated for multiple components of a tuple, and the differences being added up. It is tested on the basis of the total whether a predefined threshold is exceeded.

What is claimed is:

1. A method for data reduction of items of sensor data information comprising:

storing a plurality of data frames in a buffer memory, each data frame including a sensor data representative and an item of discard information of a discard counter; and assigning, in a comparison operation, a plurality of items of sensor data information to each data frame, wherein the comparison operation and the assigning of the items of sensor data information to the sensor data representatives includes:

in a first method step, in a situation that a first item of sensor data information is processed, storing an item of storage information in a buffer store, wherein the discard counter is in an initial state;

in a second method step, comparing the storage information to a second item of sensor data information to obtain a comparison result; and in a third method step, as a function of the comparison result, discarding the second item of sensor data information while incrementing the discard counter.

2. A method for data reduction of items of sensor data information comprising:

storing a plurality of data frames in a buffer memory, each data frame including a sensor data representative and an item of discard information of a discard counter; and assigning, in a comparison operation, a plurality of items of sensor data information to each data frame, wherein the comparison operation and the assigning of the items of sensor data information to the sensor data representative includes:

in a first method step, in a situation that a first item of sensor data information is processed, storing an item of storage information in a buffer store, wherein the discard counter is in an initial state;

in a second method step, comparing the storage information to a second item of sensor data information to obtain a comparison result; and in a third method step, as a function of the comparison result, storing a first sensor data representative of at least one item of sensor data information with an item of discard information of a discard counter in a data frame in the buffer memory and setting the discard counter to the initial state.

3. The method as recited in claim 1, wherein the storage information is one of: i) static, or ii) is newly calculated variably upon change of the discard counter information.

4. The method as recited in claim 1, wherein, for the case that the storage information is static, after the third method step, the second and third method steps are repeated using a further item of sensor data information, for the case that the storage information is variable, after the third method step, either the second and third method steps are repeated using a further item of sensor data information, or the first, the second, and the third method steps are repeated using at least one further item of sensor data information.

5. The method as recited in claim 1, wherein the sensor data representative either: i) corresponds to the assigned items of sensor data information, or ii) is newly determined from one of the assigned items of sensor data information.

6. The method as recited in claim 1, wherein a maximum run length, which corresponds to a maximum number of items of sensor data information which are assigned to a sensor data representative, is specified, storage of at least one data frames in the buffer memory being performed independently of the comparison result upon reaching the maximum run length.

7. The method as recited in claim 1, wherein, during the comparison operation, determining with the aid of a threshold whether the sensor data information is discarded, and at least one of: i) the threshold being adapted as a function of how strongly the buffer memory is filled, and ii) the run length being adapted automatically as a function of how strongly the buffer memory is filled.

8. A sensor data analysis device comprising:
   a buffer memory; and
   a comparison unit including a buffer store and a computing unit,
   wherein the sensor data analysis device is configured to receive a plurality of items of sensor data information from a sensor,
   wherein the sensor data analysis device is configured to assign multiple items of sensor data information to a data frame in the comparison unit,
   wherein the data frame is stored in the buffer memory, the data frame including a sensor data representative and an item of discard information of a discard counter that is set to an initial state,
   wherein a maximum run length is specified, the maximum run length corresponding to a maximum number of items of sensor data information which are assigned to the sensor data representative,
   wherein upon reaching the maximum run length, at least one item of sensor data information is stored in the buffer store independently of a comparison result obtained by the computing unit,
   wherein the at least one item of sensor data information stored in the buffer store includes a second item of discard information that corresponds to the maximum run length.

9. The sensor data analysis device as recited in claim 8, wherein the sensor data analysis device is designed to transfer a plurality of output data to a microcontroller, the output data including a plurality of data frames or a plurality of decompressed data frames.

10. The sensor data analysis device as recited in claim 8, wherein the sensor data analysis device is configured in such a way that a number of the sensor data representatives which are stored in a fixed period in the buffer memory is variable.

* * * * *